US012689095B2

(12) United States Patent
Zhi et al.

(10) Patent No.: US 12,689,095 B2
(45) Date of Patent: Jul. 21, 2026

(54) BIFUNCTIONAL SEPARATOR, BATTERIES CONTAINING, AND METHOD OF MANUFACTURE THEREOF

(71) Applicant: City University of Hong Kong, Kowloon (HK)

(72) Inventors: Chunyi Zhi, Shatin (HK); Yue Hou, Kowloon Tong (HK); Ze Chen, Kowloon Tong (HK)

(73) Assignee: City University of Hong Kong, Kowloon (HK)

( * ) Notice: Subject to any disclaimer, the term of this patent is extended or adjusted under 35 U.S.C. 154(b) by 673 days.

(21) Appl. No.: 17/836,245

(22) Filed: Jun. 9, 2022

(65) Prior Publication Data

US 2023/0402714 A1 Dec. 14, 2023

(51) Int. Cl.
*H01M 50/446* (2021.01)
*H01M 10/0525* (2010.01)
(Continued)

(52) U.S. Cl.
CPC ..... *H01M 50/446* (2021.01); *H01M 10/0525* (2013.01); *H01M 10/0567* (2013.01); *H01M 10/0569* (2013.01); *H01M 50/406* (2021.01); *H01M 50/426* (2021.01); *H01M 50/431* (2021.01); *H01M 2004/027* (2013.01);
(Continued)

(58) Field of Classification Search
CPC .. H01M 50/40; H01M 50/446; H01M 50/449; H01M 50/44; H01M 50/443; H01M 10/0525; H01M 10/0567; H01M 10/0569; H01M 50/406; H01M 50/426; H01M 50/431; H01M 4/386; H01M 4/387; H01M 4/463; H01M 4/485; H01M 4/505; H01M 4/525; H01M 4/5825; H01M 4/587; H01M 2004/027; H01M 2004/028; H01M 2300/0025; H01M 50/403; H01M 50/451; Y02E 60/10
See application file for complete search history.

(56) References Cited

U.S. PATENT DOCUMENTS

2019/0198837 A1 * 6/2019 Yushin ............... H01M 50/446
2020/0076009 A1 * 3/2020 Kwok .............. H01M 10/0525

FOREIGN PATENT DOCUMENTS

JP         2019216033 A  * 12/2019  ........ H01M 10/0525
WO   WO-2020242982 A1 * 12/2020  ............. C01B 21/06

OTHER PUBLICATIONS

Rao et al. "Assembly of MXene/PP Separator and Its Enhancement for Ni-Rich LiNi0.8Co0.1Mn0.1O2 Electrochemical Performance." Sep. 25, 2020. (Year: 2020).*
(Continued)

*Primary Examiner* — Bach T Dinh
*Assistant Examiner* — Gigi Lee Lin
(74) *Attorney, Agent, or Firm* — Renner, Kenner, Greive, Bobak, Taylor & Weber

(57) ABSTRACT

A separator for a battery contains a MXene nanosheet, a poly (vinylidene fluoride-co-hexafluoropropylene) framework, and a physical isolation flame retardant dispersed within the poly (vinylidene fluoride-co-hexafluoropropylene) framework. The MXene nanosheet is affixed to the poly (vinylidene fluoride-co-hexafluoropropylene) framework. A separator manufacturing method for the separator herein and a battery manufacturing method are also included.

13 Claims, 8 Drawing Sheets

(51) Int. Cl.

| | |
|---|---|
| *H01M 10/0567* | (2010.01) |
| *H01M 10/0569* | (2010.01) |
| *H01M 50/403* | (2021.01) |
| *H01M 50/406* | (2021.01) |
| *H01M 50/426* | (2021.01) |
| *H01M 50/431* | (2021.01) |
| *H01M 50/451* | (2021.01) |
| *H01M 4/02* | (2006.01) |
| *H01M 4/38* | (2006.01) |
| *H01M 4/46* | (2006.01) |
| *H01M 4/485* | (2010.01) |
| *H01M 4/505* | (2010.01) |
| *H01M 4/525* | (2010.01) |
| *H01M 4/58* | (2010.01) |
| *H01M 4/587* | (2010.01) |

(52) U.S. Cl.
CPC ...... *H01M 2004/028* (2013.01); *H01M 4/386* (2013.01); *H01M 4/387* (2013.01); *H01M 4/463* (2013.01); *H01M 4/485* (2013.01); *H01M 4/505* (2013.01); *H01M 4/525* (2013.01); *H01M 4/5825* (2013.01); *H01M 4/587* (2013.01); *H01M 2300/0025* (2013.01)

(56) References Cited

OTHER PUBLICATIONS

Zhang et al. "Synthesis of two-dimensional Ti3C2Tx MXene using HCI+LiF etchant: Enhanced exfoliation and delamination." Apr. 27, 2016. (Year: 2016).*

Maleski et al. "Size-Dependent Physical and Electrochemical Properties of Two-Dimensional MXene Flakes." Jun. 29, 2018. (Year: 2018).*

Wang et al. "Enhanced dielectric property and energy storage density of PVDF-HFP based dielectric composites by incorporation of silver nanoparticles-decorated exfoliated montmorillonite nanoplatelets." May 2018. (Year: 2018).*

Wikipedia. "Triphenyl phosphate." Mar. 14, 2021. (Year: 2021).*

RESTCO. "Types of Plastic." Dec. 3, 2021. (Year: 2021).*

Tech Briefs. "Ethyl Methyl Carbonate as a Cosolvent for Lithium-Ion Cells." Jun. 1, 2001 (Year: 2001).*

Bahloul et al "Study of the Porosity and Density of Synthetically Produced Hydroxyapatite." Research Center in Industrial Technologies (CRTI), Algeria. vol. 6 Issue 1. (Year: 2020).*

Supplementary Info to Li et al "Flexible, High-Wettability and Fire-Resistant Separators Based on Hydroxyapatite Nanowires for Advanced Lithium-Ion Batteries" Adv. Mater. 2017, 29, 1703548, which was listed in a Sep. 9, 2022 IDS (Year: 2017).*

Translation of JP2019216033A (Year: 2019).*

Gaurav Sharma et al 2017 J. Electrochem. Soc. 164 A1184;Lithium Ion Batteries with Alumina Separator for Improved Safety; Journal of The Electrochemical Society, 164 (6) A1184-A1191 (2017).

Adv. Funct. Mater. 2021, 31, 2008537; DOI: 10.1002/adfm.20200; A Rational Design for a High-Safety Lithium-Ion Battery Assembled with a Heatproof-Fireproof Bifunctional Separator; L. Peng et al.

Journal of Polymer Research (2019) 26: 20; https://doi.org/10.1007/s10965-018-1678-0; Porous PAN micro/nanofiber membranes with potential application as Lithium-ion battery separators: physical, morphological and thermal properties.

Journal of Membrane Science 549 (2018) 244-250; https://doi.org/10.1016/j.memsci.2017.12.015; Robust polyetherimide fibrous membrane with crosslinked topographies fabricated via in-situ micro-melting and its application as superior Lithiumion battery separator with shutdown function; L. Kong et al.

J. Mater. Chem. A, 2020, 8,20294; Thermotolerant separators for safe lithium-ion batteries under extreme conditions; Y. Li et al.

ACS Appl. Mater. Interfaces 2019, 11, 34895-34903; Bendable Network Built with Ultralong Silica Nanowires as a Stable Separator for High-Safety and High-Power Lithium-Metal Batteries; Q. Du et al.

Journal of Membrane Science 565 (2018) 50-60; https://doi.org/10.1016/j.memsci.2018.07.094; Tri-layer nonwoven membrane with shutdown property and high robustness as a high-safety lithium ion battery separator; Z. Li et al.

Nature Energy | vol. 6 | 790 Aug. 2021 | 790-798 | www.nature.com/natureenergy; Free-standing ultrathin lithium metal—graphene oxide host foils with controllable thickness for lithium batteries; H. Chen et al.

Nature|vol. 451|Feb. 7, 2008; Building better batteries; M. Armand et al.

https://dx.doi.org/10.1021/acs.nanolett.9b04815 Nano Lett. 2020, 20, 1686-1692;A Fireproof, Lightweight, Polymer—Polymer Solid-State Electrolyte for Safe Lithium Batteries; Y. Cui et al.

Energy Environ. Sci.,2021, 14, 3599; Human joint-inspired structural design for a bendable/foldable/stretchable/twistable battery: achieving multiple deformabilities; A. Chen et al.

Sci. Adv. 2017;3: e1601978 Jan. 13, 2017; Electrospun core-shell microfiber separator with thermal-triggered flame-retardant properties for lithium-ion batteries; Liu et al.

Adv. Energy Mater. 2021, 11, 2002721; Highly Efficient Nb2C MXene Cathode Catalyst with Uniform O-Terminated Surface for Lithium-Oxygen Batteries; G. Li et al.

DOI: 10.1002/adma.201703548; Adv. Mater. 2017, 29, 1703548; Flexible, High-Wettability and Fire-Resistant Separators Based on Hydroxyapatite Nanowires for Advanced Lithium-Ion Batteries; H. Li et al.

Nature Energy | 600 vol. 3 | Jul. 2018 | 600-605 | www.nature.com/natureenergy; Tailoring grain boundary structures and chemistry of Ni-rich layered cathodes for enhanced cycle stability of lithium-ion batteries; P. Yan et al.

Nano Lett. 2020, 20, 3798-3807; Realizing Dendrite-Free Lithium Deposition with a Composite Separator; J. Yan et al.

Nature Communications | (2021) 12:3106 | https://doi.org/10.1038/s41467-021-23369-5 | www.nature.com/naturecommunications; Manipulating anion intercalation enables a high-voltage aqueous dual ion battery; Z. Huang et al.

DOI: 10.1002/adma.201907802; Adv. Mater. 2020, 32, 1907802; Initiating Hexagonal MoO3 for Superb-Stable and Fast NH4+ Storage Based on Hydrogen Bond Chemistry; G. Liang et al.

Energy Environ. Sci., 2021, 14, 2441-2450; Zinc/selenium conversion battery: a system highly compatible with both organic and aqueous electrolytes; Z. Chen et al.

Nature Communications | (2021) 12:3106 | https://doi.org/10.1038/s41467-021-23369-5 | www.nature.com/naturecommunications 1 1234567890; Manipulating anion intercalation enables a high-voltage aqueous dual ion battery; Z. Huang et al.

DOI: 10.1002/aenm.201901751; Adv. Energy Mater. 2019, 9, 1901751; Interfacial Super-Assembled Porous CeO2/C Frameworks Featuring Efficient and Sensitive Decomposing Li2O2 for Smart Li—O2 Batteries; Y. Hou et al.

DOI: 10.1021/acsenergylett.6b00594; ACS Energy Lett. 2017, 2, 196-223; Nickel-Rich Layered Cathode Materials for Automotive Lithium-Ion Batteries: Achievements and Perspectives; S. Myung et al.

Nature Communications | 7:12909 | DOI: 10.1038/ncomms12909 |www.nature.com/naturecommunications; Quantifying microstructural dynamics and electrochemical activity of graphite and silicon-graphite lithium ion battery anodes; P. Pietsch et al.

Nature Communications | (2020) 11:6279 | https://doi.org/10.1038/s41467-020-19991-4 | www.nature.com/naturecommunications; Prospects for lithium-ion batteries and beyond—a 2030 vision; C. Grey et al.

Energy Storage Materials 37 (2021) 123-134; https://doi.org/10.1016/j.ensm.2021.01.028; Atomic layer deposition assisted superassembly of ultrathin ZnO layer decorated hierarchical Cu foam for stable lithium metal anode; R. Zhang et al.

https://doi.org/10.1038/s41560-021-00833-6; Nature Energy | vol. 6 | 790 Aug. 2021 | 790-798 | www.nature.com/natureenergy; Free-

(56) References Cited

OTHER PUBLICATIONS standing ultrathin lithium metal—graphene oxide host foils with controllable thickness for lithium batteries; H. Chen et al.

Chen et al., Joule 3, 732-744; Mar. 20, 2019 ª 2018 Elsevier Inc.; https://doi.org/10.1016/j.joule.2018.11.025; High-Energy Li Metal Battery with Lithiated Host.

Rare Met. (2022) 41(3):745-761; https://doi.org/10.1007/s12598-021-01816-y; Strategies of binder design for high-performance lithium-ion batteries: a mini review; Y. Wang et al.

Angew. Chem. Int. Ed. 2012, 51, 9994-10024; www.angewandte.org; Challenges Facing Lithium Batteries and Electrical Double-Layer Capacitors; N. Choi et al.

Sci. Adv. 2017;3: e1601978 Jan. 13, 2017; Electrospun core-shell microfiber separator with thermal-triggered flame-retardant properties for lithium-ion batteries; K. Liu et al.

Chem. Commun., 2019, 55, 10124; DOI: 10.1039/c9cc04415a; Uniform lithium deposition on N-doped carboncoated current collectors; N. Zhang et al.

Nature Materials; https://doi.org/10.1038/s41563-021-00995-4; Solid-state rigid-rod polymer composite electrolytes with nanocrystalline lithium ion pathways; Y. Wang et al.

Energy Storage Materials; Energy Storage Materials 39 (2021) 186-193; https://doi.org/10.1016/j.ensm.2021.04.020; In-situ encapsulating flame-retardant phosphate into robust polymer matrix for safe and stable quasi-solid-state lithium metal batteries; S. Tan et al.

Adv. Energy Mater. 2014, 4, 1300654; DOI: 10.1002/aenm.201300654; Nanoporous Polymer-Ceramic Composite Electrolytes for Lithium Metal Batteries; Z. Tu et al.

Adv. Energy Mater. 2018, 8, 1802130; DOI: 10.1002/aenm.201802130; Simultaneously Inhibiting Lithium Dendrites Growth and Polysulfides Shuttle by a Flexible MOF-Based Membrane in Li—S Batteries; Y. He et al.

Nano Lett. 2015, 15, 6149-6154; DOI: 10.1021/acs.nanolett.5b02432; A Thermally Conductive Separator for Stable Li Metal Anodes; W. Luo et al.

Adv. Funct. Mater. 2017, 27, 1704391; DOI: 10.1002/adfm.201704391; Suppressing Lithium Dendrite Growth by Metallic Coating on a Separator; H. Lee et al.

Adv. Funct. Mater. 2020, 30, 1907020; DOI: 10.1002/adfm.201907020; Dendrite-Free Lithium Plating Induced by In Situ Transferring Protection Layer from Separator; Z. Hu et al.

Nano Lett. 2020, 20, 1686-1692; A Fireproof, Lightweight, Polymer-Polymer Solid-State Electrolyte for Safe Lithium Batteries; Y. Cui et al.

ACS Appl. Mater. Interfaces 2019, 11, 2978-2988; In Situ Armoring: A Robust, High-Wettability, and Fire-Resistant Hybrid Separator for Advanced and Safe Batteries; L. Kong et al.

ACS Appl. Mater. Interfaces 2019, 11, 26402-26411; Flame-Retardant Bilayer Separator with Multifaceted van der Waals Interaction for Lithium-Ion Batteries; G. Zeng et al.

Adv. Energy Mater. 2020, 10, 1904281; DOI: 10.1002/aenm.201904281; Highly-Safe and Ultra-Stable All-Flexible Gel Polymer Lithium Ion Batteries Aiming for Scalable Applications; W. Shen et al.

Polym. Chem., 2021, 12, 3441; Flame retardant polyphosphoester copolymers as solid polymer electrolyte for lithium batteries; J. Olmedo-Martinez et al.

https://doi.org/10.1016/j.ensm.2020.04.041; Energy Storage Materials 29 (2020) 350-360; Halogen-free flame-retardant sulfur copolymers with stable Li—S battery performance; M. Monisha et al.

Adv. Mater. 2017, 29, 1703548; DOI: 10.1002/adma.201703548; Flexible, High-Wettability and Fire-Resistant Separators Based on Hydroxyapatite Nanowires for Advanced Lithium-Ion Batteries; H. Li et al.

ACS Nano 2021, 15, 1718-1726; Confining Aqueous Zn—Br Halide Redox Chemistry by Ti3C2TX MXene; X. Li et al.

ACS Nano 2020, 14, 8678-8688; 3D Flexible, Conductive, and Recyclable Ti3C2Tx MXene-Melamine Foam for High-Areal-Capacity and Long-Lifetime Alkali-Metal Anode; H. Shi et al.

Angew. Chem. Int. Ed. 2021, 60, 24668-24675; Stable Interface Chemistry and Multiple Ion Transport of Composite Electrolyte Contribute to Ultra-long Cycling Solid-State LiNi0.8Co0.1Mn0.1O2/Lithium Metal Batteries; K. Yang et al.

DOI : 10.1002/chem.201703894; Low-Cost and Scaled-Up Production of Fluorine-Free, Substrate-Independent, Large-Area Superhydrophobic Coatings Based on Hydroxyapatite Nanowire Bundles; F. Chen et al.

Adv. Mater. 2019, 31, 1901820; DOI: 10.1002/adma.201901820; Horizontal Growth of Lithium on Parallelly Aligned MXene Layers towards Dendrite-Free Metallic Lithium Anodes; D. Zhang et al.

Energy Environ. Sci.,2021, 14, 3492; Grafted MXene/polymer electrolyte for high performance solid zinc batteries with enhanced shelf life at low/high temperatures; Z. Chen et al.

ACS Appl. Mater. Interfaces 2016, 8, 21011-21; DOI: 10.1021/acsami.6b06455; Ti3C2 MXenes with Modified Surface for High-Performance Electromagnetic Absorption and Shielding in the X-Band; M. Han et al.

https://doi.org/10.1016/j.ssi.2018.08.013; Solid State Ionics 325 (2018) 251-257; Porous PAN micro/nanofiber separators for enhanced lithium-ion battery performance; N. Sabetzadeh et al.

ACS Appl. Mater. Interfaces 2020, 12, 46015-46026; Modeling the Interface between Lithium Metal and Its Native Oxide; J. Lowe.

Nat ure Energy | vol. 534 5 | Jul. 2020 | 534-542 | www.nature.com/natureenergy; https://doi.org/10.1038/s41560-020-0640-7; Low-temperature and high-rate-charging lithium metal batteries enabled by an electrochemically active monolayer-regulated interface; Y. Gao et al.

Adv. Funct. Mater. 2021, 31, 2001974; DOI: 10.1002/adfm.202001974; Achieving Stable Cycling of LiCoO2 at 4.6 V by Multilayer Surface Modification; T. Cheng et al.

* cited by examiner

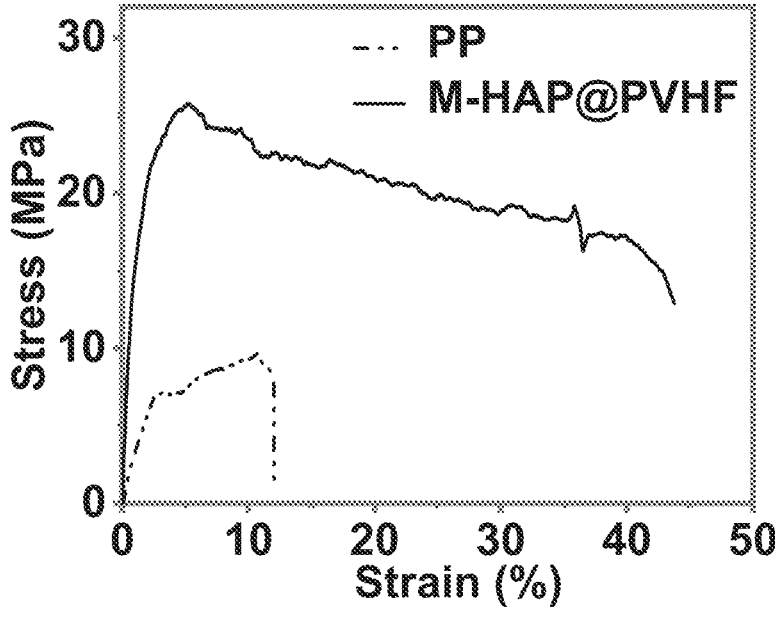
Fig. 8b
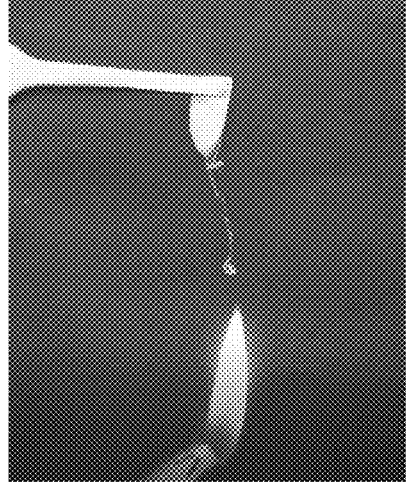
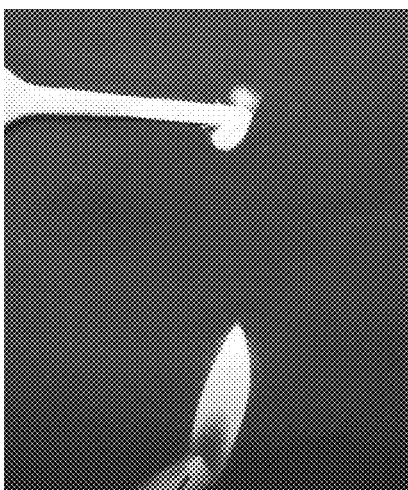
Fig. 9a                              Fig. 9b

BIFUNCTIONAL SEPARATOR, BATTERIES CONTAINING, AND METHOD OF MANUFACTURE THEREOF

FIELD OF THE INVENTION

The present invention relates to lithium-ion batteries, their components, and design. More specifically, the present invention relates to an improved separator for lithium-ion batteries their components, and design.

BACKGROUND

Batteries, and particularly lithium-ion batteries (LIBs), are ubiquitous in modern society. However, while having a high energy density, LIBs possess a variety of problems, such as reduced electricity retention over time and after multiple recharges, spontaneous combustion potential especially upon damage to the battery, recyclability, etc.

Many of these issues relate to the in situ formation of lithium (Li) dendrites starting at the anode and growing towards the cathode during the battery's lifecycle, especially during extended charging and the general unpredictability of when and where such non-uniform dendrites will form. For example, the separators can be punctured by the generated Li dendrites owing to non-uniform Li deposition at a high current density or long cycle tests. This may result in multiple problems such as uneven heat flow release potentially causing short circuits, thermal runaway, thermal cascade/fire and even battery explosion. In addition, the "dead Li" is formed because of the continuous side reaction between Li anodes and electrolytes and the uncontrolled deposition/dissolution of lithium metal, reducing the Li ion concentration in solution and deteriorating overall battery performance.

Strategies to create dendrite-free lithium batteries typically employ the use of separators (i.e., physical insulation layers to separate the anode and cathode) such as polypropylene (PP) and/or the formation of a solid electrolyte interface (SEI) on the lithium anode via in situ reactions between Li ions and coating layers such as $Al_2O_3$, $Li_3PO_4$ so as to prevent dendrites from forming. However, it is difficult to establish a stable SEI layer on the Li anode, leading to irreversibly decomposition of electrolytes. These factors hinder the application of Li metal and have a negative effect on battery performance. Accordingly, an in-situ preliminarily generated passivate layer acting as an SEI layer can be directedly introduced on the Li metal anode by coating the separator with a lithiophilic layer reactive with Li metal, which has proved to be a cost-efficiency strategy to protect the Li metal anode.

However, creating such separators via in situ deposition is difficult and complicated to control. Since such the separators and resulting SEIs must be created in situ during the Li plating/striping of the anode, they must be created in a very tightly controlled environment (e.g., a glove box) due to the sensitivity and reactivity of Li metal. The formation of $Al_2O_3$ induced SEIs and $Li_3PO_4$ induced SEIs also must occur under harsh in situ conditions. Such requirements also lead to other issues such as reduced production speed, higher production costs, greater waste, difficult operation and/or uncontrollable dispersibility.

Luo (Luo, et al., *Nano Lett.* 2015, vol. 15, (9), pp. 6149-54) reports that the thermally conductive boron nitride nanosheet coating layer plays an essential role in the uniform deposition/stripping of Li and long stable cycle life of LIBs. Lee, et al., (Lee, et al., *Adv. Funct. Mater.*, 2017, vol.

27, (45), 1704391) designs a Janus-faced separator by decorating a commercial PE separator with CuTF to regulate the excessive Li metal deposition, suppressing the "dead" Li growth and manipulating the morphology of Li dendrites on Li metal surface. Hu, et al., (Hu, et al., *Adv. Funct. Mater.*, 2019, vol. 30, (5), 1907020) improves the Coulombic efficiency and cycle life by using $PbZr_{0.52}Ti_{0.48}O_3$ (PZT) on the surface of the separator, which can be reduced by Li foil to form a Pb—Li alloy, transferring an in situ protecting layer from the separator to Li foil. However, safety concerns causing by the thermal shrinkage of separators and the ignition of flammable liquid electrolytes still exists.

Accordingly, the need exists for an improved separator, an improved battery design, a method to regulate the more uniform growth and/or deposition of Li dendrites in a LIB, a thermo-stable separator, a more fire-retardant separator, a separator providing improved electrical stability, a separator providing improved mechanical stability, and/or an improved method for separator production.

SUMMARY OF THE INVENTION

An embodiment of the present invention relates to a separator for a battery contains a MXene nanosheet, a poly (vinylidene fluoride-co-hexafluoropropylene) framework, and a physical isolation flame retardant dispersed within the poly (vinylidene fluoride-co-hexafluoropropylene) framework. The MXene nanosheet is affixed to the poly (vinylidene fluoride-co-hexafluoropropylene) framework.

An embodiment of the present invention relates to a separator manufacturing method containing the steps of providing a plurality of MXene flakes, providing a poly (vinylidene fluoride-co-hexafluoropropylene) framework containing a physical isolation flame retardant dispersed therein, and coating the poly (vinylidene fluoride-co-hexaflouropropylene) framework with the MXene flakes to form a MXene nanosheet coating on the poly (vinylidene fluoride-co-hexaflouropropylene) framework.

An embodiment of the present invention relates to a method for manufacturing a battery anode containing the steps of providing the separator manufactured according to the method described herein, providing a battery anode, and affixing the separator to the battery anode.

Without intending to be limited by theory, it is believed that while most Li dendrite regulation research concentrates on Li anode modification, it has been surprisingly found that modifying the separator is a more ubiquitous method to tune the Li-ion flux and suppress uncontrolled dendrite growth. Furthermore, it is believed that the SEI herein may avoid the need for SEI creation under harsh operation conditions. Instead, a bifunctional separator, such as M-HAP@PVHF, possesses outstanding fire resistance and effective Li dendrites tunability. Furthermore, where the PVHF is selected as the polymer framework due to its flexibility and competent mechanical strength, HAP networks serve as the flame-retardant additives, and the flexible 2D $Ti_3C_2T_x$ MXene flakes for a MXene nanosheet with high lithiophilicity act as a Li dendrites regulator.

Without intending to be limited by theory, it is believed that the uniform SEI layer created on the Li anode is able to accelerate the Li-ions stripping and plating process, inducing a quite lower overpotential in Li/Li symmetric cell tests when contrasted to LIBs assembled with commercial PP separator. Simultaneously, the separator herein exhibits a competent flame resistance, surviving more than 20 s in the fire tests without volume shrinkage. Consequently, a symmetric cell based on the separator herein delivers a stable lifespan of 700 h with an ultralow overpotential of 15.8 mV at 2 mA cm$^{-1}$ thanks to the stable SEI layer of LiF and uniform deposition of Li dendrites. Furthermore, full LiCoO$_2$/Li batteries assembled with a M-HAP@PVHF membrane, showcase improved cycling stability and rate capability when compared to a commercially-available separator. It is believed that this rational design of a bifunctional separator can significantly enhance the practical feasibility of constructing artificial SEI layers and decrease the risk of battery explosion, shedding light on the development of high-security Lithium-based batteries.

BRIEF DESCRIPTION OF THE DRAWINGS

FIG. 8*b* shows stress-strain curves of a commercial PP separator and an embodiment of the separator herein;

FIG. 9*a* shows a photograph of a commercial PP separator fire resistance test at 0 s;

FIG. 9*b* shows a photograph of a commercial PP separator fire resistance test at 1 s;

Figure 1:
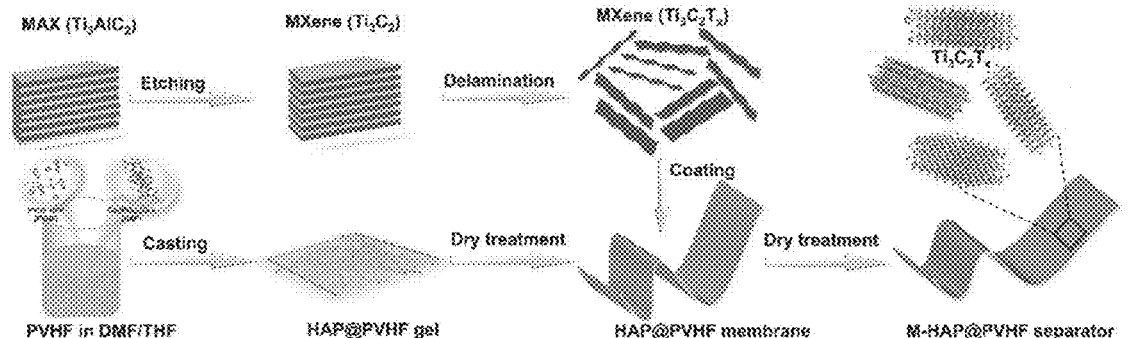
FIG. 1 shows a schematic diagram of an embodiment of the manufacturing process herein.

The figures herein are for illustrative purposes only and are not necessarily drawn to scale.

DESCRIPTION OF THE PREFERRED EMBODIMENTS

Unless otherwise specifically provided, all tests herein are conducted at standard conditions which include a room and testing temperature of 25° C., sea level (1 atm.) pressure, pH 7, and all measurements are made in metric units. Furthermore, all percentages, ratios, etc. herein are by weight, unless specifically indicated otherwise. It is understood that unless otherwise specifically noted, the materials compounds, chemicals, etc. described herein are typically commodity items and/or industry-standard items available from a variety of suppliers worldwide.

As used herein, the term "battery" indicates a chemical-based energy storage device; or a lithium-ion battery. The battery herein may contain a single electrochemical cell, or a plurality of electrochemical cells.

As used herein the term "HAP" indicates hydroxyapatite having the empirical formula Ca$_{10}$(PO$_4$)$_6$(OH)$_2$.

As used herein the term "HAP@PVHF" indicates a PVHF framework containing HAP nanowires dispersed therein.

As used herein the term "Li" indicates Lithium.

As used herein the term "LIB" indicates a lithium-ion battery.

As used herein, the term "lithiophilic" indicates that lithium ions are attracted thereto.

As used herein the term "MXene" indicates an emerging two-dimensional transition metal carbide or carbonitride, known as M$_{n+1}$X$_n$T$_x$, among which M is a transition metal such as titanium, niobium, molybdenum and vanadium, X is carbon or nitrogen acquired by HF or HF-forming etching, and T is a terminating group such as —O, —OH, —Cl or —F; or —F. T$_x$ indicates various terminations such as —OH, —O, or —F. In an MXene herein, it is understood that n+1 layers of the transition metal M cover n layers of X in an [MX]$_n$M arrangement.

As used herein, the term "M-HAP@PVHF" indicates a separator according to the present invention containing a MXene nanosheet, preferably coated on both sides of a PVHF framework containing HAP nanowires dispersed therein.

As used herein, the term "PVHF" indicates poly (vinylidene fluoride-co-hexafluoropropylene).

As used herein the term "SEI" indicates a solid electrolyte interface, typically on, near, or enveloping the anode.

As used herein "SEM" indicates scanning electron microscope.

An embodiment of the present invention relates to a separator for a battery containing a MXene nanosheet, a poly (vinylidene fluoride-co-hexafluoropropylene) (PVHF) framework and a physical isolation flame retardant dispersed within the poly (vinylidene fluoride-co-hexafluoropropylene) framework. The MXene nanosheet is affixed onto the poly (vinylidene fluoride-co-hexafluoropropylene) framework.

In an embodiment herein the MXene nanosheet has the empirical formula Ti$_3$C$_2$T$_x$, where T$_x$ indicates surface terminations such as —OH, —O or —F. Such MXene nanosheets are produced by combining deionized water, hydrogen chloride solvent, LiF, Ti$_3$AlC$_2$ MAX ceramic powder (available from, for example, 11 Technology Co., Ltd., of Changchun, China. See: http://www.11tech.com.cn/) as described herein.

Without intending to be limited by theory, it is believed that the MXene provides a very uniform and lithiophilic layer. The surface termination T$_x$ groups, such as fluorine (—F) groups, on the MXene surface possess negative absorption energy towards Li ions, meaning that Li-ions spontaneously adsorb onto the MXene surface. It is believed that the F-terminated groups' lithophilicity suppresses the electrolyte decomposition and contributes towards the uniform growth of SEI layers containing LiF. This in turn leads to a very uniform electromigration of lithium ions in, for example, a lithium-ion battery (LIB). In addition, it is believed that the MXene herein provides a low ionic transport barrier (i.e., is very easy for ions to pass through) when used in a battery, and this in turn enables, at a molecular level, a homogenous and fast ion flux at the electrode level.

In addition, it is believed that the MXene nanosheet herein possesses very high mechanical strength which reduces punctures of the PVHF framework and therefore reduces short circuits in turn leading to greater LIB safety and reduces chance of fires and other problems. Thus, lithium dendrite growth is more uniform and predictable, leading to improved LIB stability, reduced separator puncture, short circuits, thermal runaway, excess local heat generation, battery explosion, etc.

In the industry, $Ti_3C_2T_x$ MXenes are known for use in electromagnetic interference shielding, transparent electrodes, sensors, catalysis, photothermal therapy, etc. However, this is the first time to employ $Ti_3C_2T_x$ MXenes to regulating Li dendrite growth in functional separators.

It is also believed that the PVHF framework herein provides a very strong and flexible substrate which physically protects the anode, cathode and a combination thereof; or anode, from dendrite punctures and short circuits, while also being easy to manufacture. In fact, the PVHF framework may be manufactured separately as described herein and then affixed to the anode, cathode, or both; or anode. In addition, the PVHF framework provides excellent mechanical strength and good flexibility.

The PVHF framework is a polymer matrix having an intrinsic high ionic conductivity, relatively low crystallinity, and outstanding mechanical strength. While other polymers such as poly(methyl methacrylate) and poly(acrylonitrile) also possess an intrinsic high ionic conductivity, it has been found that they are too fragile and this possess insufficient mechanical strength to be used as the polymer framework in a separator. In contrast, PVHF shows better mechanical properties and a synergistic compatibility with physical isolation flame retardant via hydrogen bonding. Without intending to be limited by theory, it is believed that physical-isolation flame retardants with physical-isolation mechanisms and good wettability for electrolytes may work better as a flame retardancy component in a separator.

In an embodiment herein, the PVHF framework is in the form of a membrane; or a sheet, meaning it is a planar, typically flexible, and significantly larger and expansive in its width and depth in the X-Y directions than its thickness in the Z-direction. Thus, the PVHF framework has a first side and a second side opposite the first side, typically where the first side is planar and the second side is also planar.

In an embodiment herein, the PVHF framework is coated with the MXene nanosheet on at least the first side thereof; or the first side of the PVHF framework is coated with the MXene nanosheet and the second side is coated with the MXene nanosheet.

The PVHF framework contains a physical isolation flame retardant dispersed; or evenly-dispersed, therein. The physical isolation flame retardant useful herein is an inherently flame-retardant compound and serves to reduce the flammability of separator, the PVHF framework, the SEI, etc. and in turn increase the fire retardancy of the battery itself. Without intending to be limited by theory, it is believed that the physical isolation flame retardant isolates the combustible material from the air. More specifically, HAP nanowires are a kind of phosphorous flame retardant with a phosphorous content of about 18.5 wt %, which release the highly effective fire-quenching radicals $PO_2^·$, $PO^·$, and $HPO^·$ when subjected to excess heat.

In an embodiment herein the physical isolation flame retardant is selected from the group consisting of hydroxyapatite (HAP), ammonium polyphosphate (APP), triphenyl phosphate (TPP), decabromodiphenyl ethane (DCDPE), and a combination thereof; or hydroxyapatite, due to its high thermal stability, greater number of releasable phosphorous atoms, and superior fire resistance/retardancy.

In an embodiment herein the physical isolation flame retardant is provided in the shape of a particle, a wire, and a combination thereof; or a flake, a nanowire, and a combination thereof; or a nanowire. nanowire has a diameter of from about 1 nm to about 500 nm; or from about 2 nm to about 250 nm; or from about 5 nm to about 100 nm. In an embodiment herein, the physical isolation flame retardant is a hydroxyapatite nanowire (HAPN).

The separator, and especially the M-HAP@PVHF separator, herein is particularly useful as a separator for a battery; or a lithium-ion battery; or a lithium cobalt oxide ($LiCO_2$)-based battery, or a $LiCO_2$—lithium foil—based battery, for either the cathode, the anode, or both. In an embodiment herein, the SEI is a bifunctional separator for a battery anode, in that it regulates the SEI growth to grow in a uniform manner at the Li anode and also enhances the flame retardancy of the LIB. Furthermore, it is believed that the ion flux properties and the uniform pore distribution provides tunability of the Li dendrites that form during use of a LIB. This in turn improves the LIB'S cyclability and helps to reduce the drop in battery charge and capacity over time.

In an embodiment herein, the battery anode contains an anode material selected from the group of graphite, $Li_4Ti_5O_{12}$, lithium foil, silicon, a silicon alloy, a germanium alloy, an aluminum alloy, a tin alloy, an antimony alloy, an indium alloy and a combination thereof, or a lithium foil, graphite and a combination thereof; or lithium foil; or graphite. In an embodiment herein, the battery cathode contains a cathode material selected from the group of $LiFePO_4$, NCM 523, NCM811, $LiCoO_2$, $LiMn_2O_4$, and a combination thereof; or $LiCoC_2$, $LiMn_2O_4$ and a combination thereof; or $LiCoO_2$; or $LiMn_2O_4$.

It is further believed that, for example in a typical LIB, the SEI is known to be formed in situ (e.g., in a glove box) on the surface of the anode from the electrochemical reduction of the electrolyte and plays a crucial role in the long-term cyclability of the LIB. While previous SEIs have been reported to be a complex mixture of compounds, it is believed that in previous LIBs, the initially formed components of the SEI are dominated by unstable SEI components such as LiF, $Li_2CO_3$, lithium ethylene dicarbonate (($CH_2OCO_2Li)_2$, LEDC) and lithium alkyl carbonates ($ROCO_2Li$).

In contrast, with the present invention it is believed that the M-HAP@PVHF separator herein beneficially builds a highly fluorinated SEI layer of LiF, rather than the above unstable SEI components. Moreover, the high porosity of the LiF SEI may enable the homogeneous distribution of $Li^+$ ion flux in the electrolyte while highly active LiF may release fluoride and lithium ions to reinforce the formation of the fluorinated SEI layer. Thus, it is believed that the high Li-ion porosity of the present invention provides a SEI layer which has and promotes homogenous Li-ion/$Li^+$ ion flux distribution at the electrolyte/anode interface. Furthermore, the —F surface termination groups on the M-HAP@PVHF separator may combine with $Li^+$ to reinforce the formation of a uniform LiF SEI layer on Li anode. Without intending to be limited by theory it is believed that the separator, and especially the M-HAP@PVHF separator, herein can greatly enhance the coulombic efficiency and rate capability of $LiCoO_2$-based batteries. It is further believed that the separator, and especially the M-HAP@PVHF separator, herein may lower the overpotential of Li symmetric cells by promoting uniform electromigration of lithium ions during use and recharging.

It has been found that it is desirable for the M-HAP@PVHF separator herein to possess both small and uniform pores for ion transport through the separator. Without intending to be limited by theory, it is believed that the casting coating method used herein provide a very uniform pore distribution. Furthermore, the pore size useful herein is less than 1 μm in diameter; or less than about 100 nm in diameter; or from about 0.001 nm to about 75 nm in diameter; or from about 0.005 nm to about 30 nm in diameter; or from about 0.01 nm to about 10 nm in diameter.

In addition, it has been found that the present M-HAP@PVHF separator possesses low thermal shrinkage as compared, to, for example. a commercial polypropylene (PP) separator. This is shown in the flame tests (see, e.g., FIGS. 9a-9d). It is believed that this low thermal shrinkage and temperature stability enhances anode protection and safety during use and recharging, by reducing the chance of short circuits, thermal runaway, etc. The present SEI herein also shows improved electrochemical stability, can induce the even and homogenous formation of LiF SEI and thus improve the electrochemical performances when compared to, for example, a current commercial polypropylene separator.

In an embodiment herein, the MXene nanosheet is in the form of a plurality of MXene flakes. Furthermore, in an embodiment herein, the plurality of MXene flakes have an average diameter of from about 0.1 μm to about 750 μm; or from about 0.5 μm to about 325 μm; or from about 1 μm to about 100 μm; or from about 2 μm to about 50 μm. Without intending to be limited by theory, it is believed that if the flakes are too large they could block the ion pores in the separator and thus lower the dispersibility of the electrolyte. However, if the flakes are too small then it would be more difficult to uniformly distribute them on the surface of HAP@PVHF membrane.

The M-HAP@PVHF separator herein typically contains from about 5% to about 20% MXene nanosheet; or about 7% to about 18% MXene nanosheet; or from about 10% to about 15% MXene nanosheet, by weight of the separator.

In an embodiment herein, the MXene nanosheet has an average thickness of from about 1 nm to about 10 μm; or from about 10 nm to about 1 μm; or from about 50 nm to about 750 nm.

The separator herein typically contains from about 20% to about 100% poly (vinylidene fluoride-co-hexafluoropropylene) framework; or 50% to about 80% poly (vinylidene fluoride-co-hexafluoropropylene) framework; or 60% to about 70% poly (vinylidene fluoride-co-hexafluoropropylene) framework, by weight of the solid electrolyte interface.

The separator herein typically contains from about 20% to about 80% physical isolation flame retardant; or about 20% to about 50% physical isolation flame retardant; or from about 30% to about 40% physical isolation flame retardant, by weight of the solid electrolyte interface.

In an embodiment herein, the battery is a LIB containing an electrolyte containing, for example, ethylene carbonate, ethyl methyl carbonate, and dimethyl carbonate in about a 1:1:1 vol % ratio, and containing lithium hexafluorophosphate. Such a LIB further may contain lithium foil as the and one and LiCoO₂ as the cathode.

Materials:

N, N-Dimethylformamide (DMF), Tetrahydrofuran (THF), CaCl₂, NaH2PO4·2H2O, sodium oleate are purchased from Aladdin. Poly (vinylidene fluoride-cohexafluoropropylene) (PVHF, average Mn~130,000) is purchased from Sigma Aldrich. Ti₃AlC₂ ceramics powder is directly purchased from 11 Technology Co., Ltd.

Characterization Methods

The microstructure of samples is investigated using a field-emission scanning electron microscope (SEM; ZEISS GeminiSEM 300), and the surface area and pore volume of samples are explored by BET surface area services (BET; Micromeritics ASAP2460). The phase composition transition is characterized by X-ray diffraction equipment (XRD; Bruker D2 Phaser) under Cu Kα radiation at 30 kV and the polymer component was verified by Fourier transform infrared spectroscopy (FT-IR, PerkinElmer Spectrum II) wis used to verify the polymer components. The valence states of Li foil are revealed by X-ray photoelectron spectroscopy (XPS; ESCALAB 250). The concentration of polymer is analyzed by thermogravimetric (TG) and differential scanning calorimetry (DSC; DSC Q2000, TA Instrument, heating rate 10° C. min⁻¹ from −70° C. to 400° C. in flowing air). The mechanical properties are tested by electronic universal testing machine (HS-3001D).

Electrochemical Measurements

The electrochemical performance of separators is investigated by assembling CR2032 coin-type batteries in an argon-filled glove box, employing Li foil as the anode, LiCO₂ cathode and 1.0 M LiPF₆ in EC:DEC:EMC=1:1:1 Vol % as the working electrolyte. The LiCO₂ cathode is prepared by a slurry coating method, mixing commercial LiCO₂ powder with conductive carbon (Super P, TIMCAL) and polyvinylidene fluoride (PVDF) in N-methyl-2-pyrrolidinone (NMP) with a weight ratio of 8:1:1. The rate performance and cyclability are investigated by galvanostatic charge-discharge testing on a battery measurement device (LAND CT2001A). The specific capacity is calculated on the mass of LiCO₂. Cyclic voltammetry (CV) curves and electrochemical impedance spectroscopy (EIS) are tested on an electrochemical workstation (CHI 760D). The ionic conductivity was determined by the equation ($\sigma = L/(R_b \cdot A_s)$), in which σ means the ionic conductivity, L is the thickness of the separator, R is the bulk resistance measured by sandwiching the electrolyte-soaked separator between two Ti electrodes in the frequency range from 0.1 Hz to 100 KHz, and $A_s$ represents the area of the Ti electrodes.

Computational Details.

The first principles calculation in this work is performed by the Castep code on the Materials Studio software on the basis of density functional theory (DFT) as per Li, et al., *ACS Nano,* 2021 and Grimme, S. *J. Computational Chem.,* 2006, 27, (15), 1787-99. The ion-electron interactions are analyzed by the projector augmented wave (PAW) method as per Perdew, et al.. *Phys. Review Letters* 1996, 77, 3865-68. Moreover, the generalized gradient approximation in the Perdew, et. al., (GGA-PBE) form is selected, while the cutoff energy for plane-wave basis set is set as 350 eV. Additionally, the converge thresholds for energy and force are set to 10⁻⁵ eV and 0.02 eV/Å, respectively. The model of Ti₃C₂F₂ is built by saturating the superficial Al atoms via coordinating with the F group, given the dominant F terminations generated during the etching. A 3×3×1 supercell of Ti₃C₂F₂ is employed, and a gamma-centered 3×3×1 Monkhorst-Pack k-point mesh is set as the Brillouin zone. We constructed a vacuum space of 20 Å in z direction to avoid the interaction from periodic boundary conditions. The following formula guided the adsorption energy ($E_{ads}$):

$$E_{ads} = E_{all} - E_{MXene} - E_{Li}$$

in which $E_{total}$, $E_{MXene}$, and $E_{Li}$ represent the energy of MXene nanosheets adsorbed with Li atoms, pure MXene, and pure Li atoms, respectively.

Example 1

FIG. 1 shows a schematic diagram of an embodiment of the manufacturing process herein. First, a laminated $Ti_3C_2T_x$ MXene is prepared by a conventional chemical-etching method, in which the Al layer from MAX ($Ti_3AlC_2$) (available from. 11 Technology Co., Ltd; Changchun City, Jilin Province, P. R. China.) is etched with a LiF/HCl solution according to a typical procedure.[36, 42] Second, HAP nanowire networks are prepared by the calcium oleate precursor solvothermal method Specifically, $Ti_3C_2T_x$ MXene are prepared by a mature wet chemical etching approach. Typically, 1 g $Ti_3AlC_2$ MAX powder was gradually dispersed into 20 mL of etchant consisting of 15 ml HCl, 5 ml deionized water and 1 g LiF. The above mixture is kept stirring in a water bath for 48 h at 35° C. The single-layered $Ti_3C_2T_x$ MXene aqueous solution is obtained after being washed and centrifugated repetitively with deionized water at 3500 rpm. The solid content of the $Ti_3C_2T_x$ MXene solution is 0.1 wt %.

Self-assembling 2D HAP nanowire networks are fabricated by the calcium oleate precursor hydrothermal method (Li, et. al., *Chem. Nano. Mat.* 2017, vol. 3, (4), pp. 259-68) where 2.4 g sodium oleate is dissolved in 25 mL deionized water, and at the same time, 2.22 g $CaCl_2$ was dissolved in 20 mL deionized water. A white suspension was formed after mixing the above two solutions under continuous stirring for 1 h, and then are added into a $NaH_2PO4·2H_2O$ aqueous solution (25 mL, 1.12 wt %) to acquire the reaction mixture. Finally, the mixture undergoes a heat treatment process at 200° C. for 36 h sealing in a 100 mL stainless steel autoclave. The hydrothermal product is washed with water and ethanol three times, respectively, and then dried in a vacuum oven at 60° C. overnight to prepare self-assembled 2D HAP nanowire networks.

Then, the as-prepared HAP nanowires and PVHF undergo a self-assembly hybridization process in a mixed solution with DMF and THF through continuous stirring in an oil bath set at 60° C.

Next, the PVHF framework is fabricated by a solution-casting method and dried in a vacuum oven overnight. Typically, 0.6 g PVHF and 0.36 g HAP nanowire networks are sufficiently dissolved in a solution containing 1.8 mL DMF and 4.2 mL THF by continuous stirring at 60° C. for 6 h in an oil bath. Then the solution is casted onto a piece of glass slide. The white membrane can be prepared after drying the casted solution in vacuum at 40° C. for 48 h.

Figure 6:
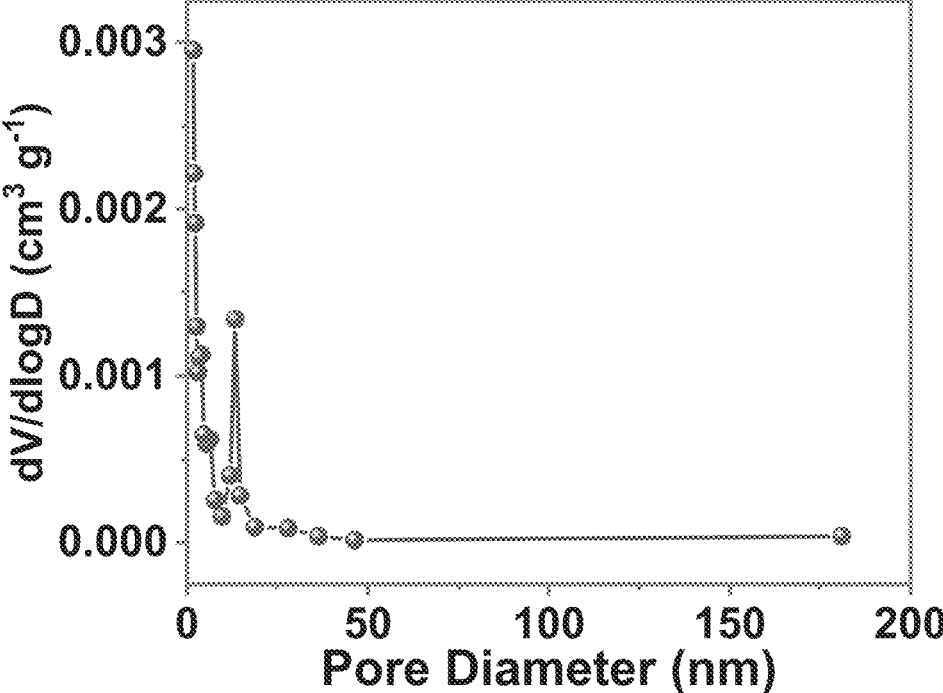
FIG. 6 shows pore diameter distribution curves of an embodiment of the prepared M-HAP@PVHF separators.

Finally, the M-HAP@PVHF separator was prepared by coating MXene on HAP@PVHF membrane through a blade coating procedure. FIG. 6 shows pore diameter distribution curves of an embodiment of the prepared M-HAP@PVHF separators, and indicates that the SEI possesses relatively uniform pores of about 10 nm in diameter.

The paper-like M-HAP@PVHF separator integrated the regulating Li dendrite function of MXene, the superior fire resistance of HAP networks, with excellent flexibility of PVHF polymer, was obtained by coating MXene HAP@PVHF membrane through a blade coating procedure. It is expected that the as-prepared M-HAP@PVHF membrane has the great potential to serve as a bifunctional separator for LIBs.

Example 2

Figures 7, 8A:
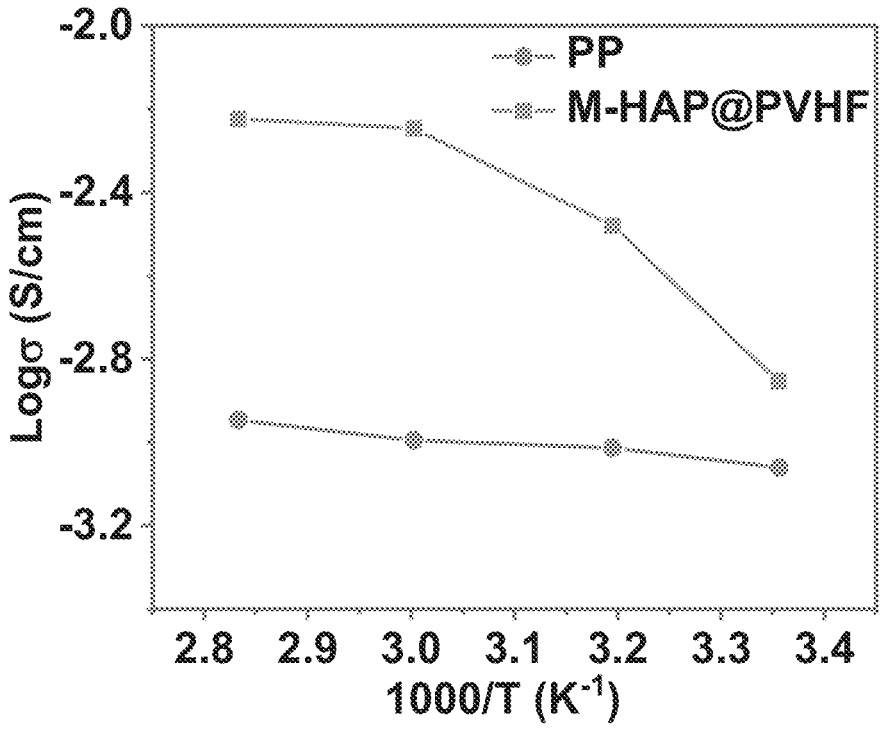
FIG. 7 shows temperature scan of the ionic conductivities of an embodiment of the prepared separator vs. a conventional PP separator.
FIG. 8*a* shows photographs of a commercial PP separator, an embodiment of a HAP@PVHF, and an embodiment of a M-HAP@PVHF separator herein.

FIG. 8a shows photographs of a commercial PP separator (left), an embodiment of a HAP@PVHF (center), and an embodiment of a M-HAP@PVHF separator herein (right). FIG. 8b shows stress-strain curves of a commercial PP. separator and an embodiment of the separator herein.

The flame retardant properties of the conventional, commercial PP. separator are compared to the M-HAP@PVHF by burning the two separators for a specific time.

FIG. 9a shows a photograph of a commercial PP separator fire resistance test at 0 s, while FIG. 9b shows a photograph of a commercial PP fire resistance test at 1 s. As can be seen, the commercial PP separator is not fire resistant as it burns to almost nothing within 1 second.

Figures 9C, 9D, 10A, 10B, 10C, 10D:
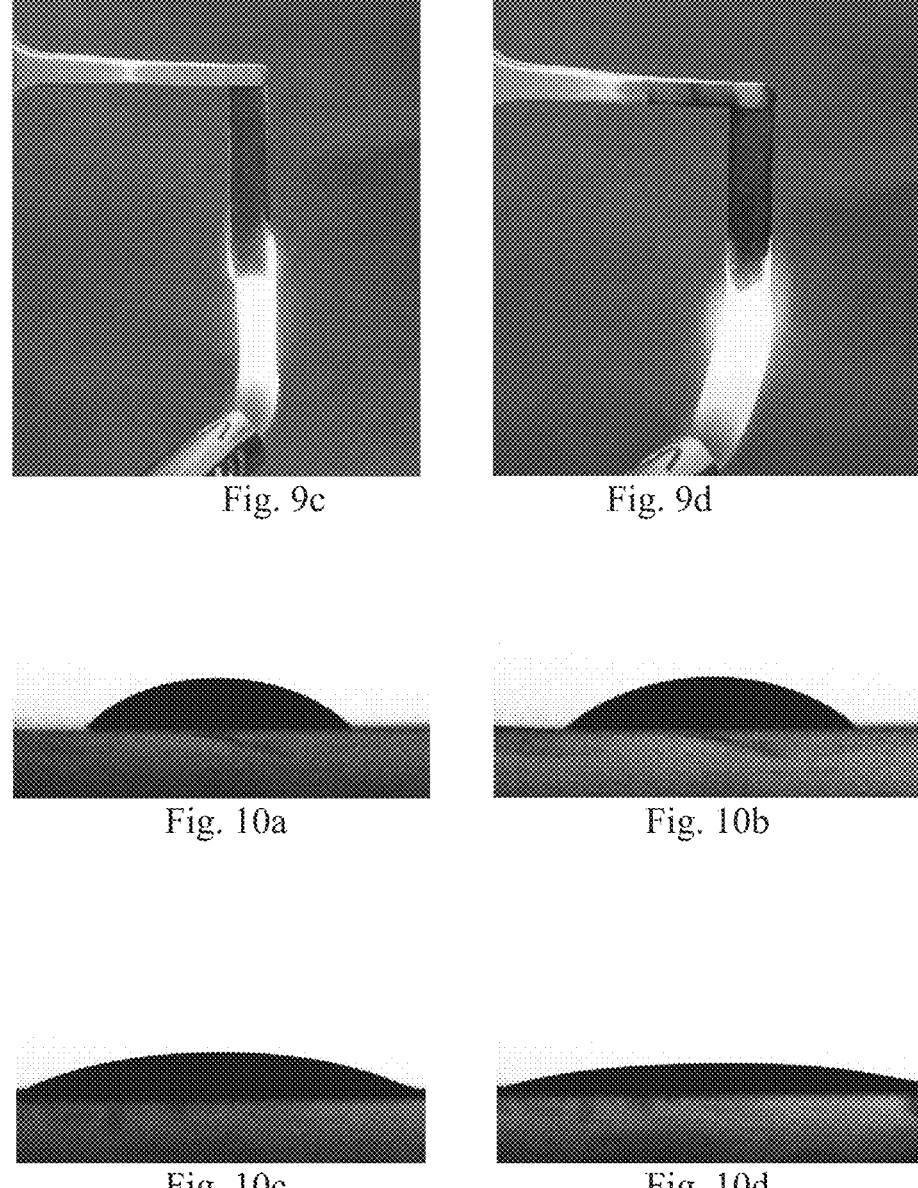
FIG. 9*c* shows a photograph of a fire resistance test of an embodiment of the M-HAP@PVHF separator herein at 1 s.
FIG. 9*d* shows a photograph of a fire resistance test of an embodiment of the M-HAP VHF separator herein at 20 s.
FIG. 10*a* shows the contact angle of a commercial PP separator after 5 s.
FIG. 10*b* shows the contact angle of a commercial PP separator after 25 s.
FIG. 10*c* shows the contact angle of an embodiment of the M-HAP@PVHF separator hereinafter 1 s.
FIG. 10*d* shows the contact angle of an embodiment of the M-HAP@PVHF separator hereinafter 10 s.

FIG. 9c shows a photograph of a fire resistance test of an embodiment of the M-HAP@PVHF separator herein at 1 s, while FIG. 9d shows a photograph of a fire resistance test of an embodiment of the M-HAP@PVHF separator herein at 20 s. As can be seen even after the M-HAP@PVHF separator is essentially unchanged and unburned.

FIGS. 9a-9d show the M-HAP@PVHF SET s intrinsically high thermal stability and non-flammability as compared to a commercial PP. separator which is much more susceptible to high temperature shrinkage and more likely to lead to LIB short circuits, resulting in increased safety concerns. In contrast, it is believed that the M-HAP@PVHF separatorherein may better withstand temperature stress and temperature-induced shrinkage so as to prevent physical contact between the LIB's anode and cathode. This in turn may broaden the temperature range/conditions in which LIBs may be used, and may also reduce LIB thermal runaway and resultant fires/explosions.

FIG. 10a shows the contact angle of a commercial PP separator after 5 s while FIG. 10b shows the contact angle of a commercial PP separator after 25 s. As can be seen the liquid electrolyte drop on the commercial PP separator at 5 s and 25 s is essentially the same with a contact angle of about 39.5°.

FIG. 10c shows the contact angle of an embodiment of the M-HAP@PVHF separator hereinafter 1 s and FIG. 10d shows the contact angle of an embodiment of the M-HAP@PVHF separator hereinafter 10 s. In contrast, to the commercial PP. separator, the liquid electrolyte drop on a M-HAP@PVHF separator, immediately spreads out and penetrates into the as-prepared M-HAP@PVHF separator herein within 10 seconds, presenting a contacting angle of about 14°. This suggests that the M-HAP@PVHF separator herein provides significantly better wettability to the liquid electrolyte and faster ion diffusion capability of the MXene-coated HAP@PVHF separator when compared with the commercial PP separator.

Example 3

Stability and Reversibility of the Li Anode with the Separator

The as-prepared M-HAP@PVHF separator and the Celgard 2400 separator (a commercially-available PP. separator available from https://www.celgard.com/, a wholly-owned subsidiary of Asahi Kasei of Tokyo, Japan) are employed in symmetric cells to study Li deposition morphologies. Measurements of Li plating/stripping voltages show a gradual drop during the initial 20 h due to the gradual elimination of the native oxidation layer on the surface of Li foil, and then exhibit stable polarization voltages around 159 mV and 25 mV for PP and M-HAP@PVHF separator, respectively. Remarkably increased hysteresis is been observed after 50 h for the cell with PP separator, indicating that the unlimited growth of SEI gradually exceeds its critical thickness and leads to the formation of "dendrites" that potentially will short-circuit the cell. In contrast, no noticeable increase of polarization voltage is shown in profiles for the cell with a M-HAP@PVHF separator. This demonstrates the controllable limited growth of SEI on the Li anode using the M-HAP@PVHF separator of the invention. The symmetric cell composed of M-HAP@PVHF is cycled at 2 mA cm$^{-1}$ and delivers a stable 700 h-cycle life with an ultralow overpotential of 15.8 mV, whereas PP.-based Li/Li cells demonstrate a significant decrease. This implies that the stable SEI layer of LiF and the uniform deposition (i.e., tuning) of Li dendrites may be induced by the MXene functional layers on M-HAP@PVHF.

After cycling for 200 h, the symmetric cells are disassembled, and the morphologies of the Li foil and separator are analyzed via SEM images. It is found that the PP. cell's foil is coarse and Li unevenly deposited and forming dendrites to a thickness of about 72 μm. In contrast, the M-HAP@PVHF separator cell has a Li foil thickness (including Li deposited dendrites) is about 35 μm. The M-HAP@PVHF cell's Li deposition layer appears much denser and even than the coarse Li deposition layer observed in the corresponding PP cell. This, it is believed that the MXene functional layer on the M-HAP@PVHF provides a more uniform Li dendrite deposition.

As it is believed that the physical and chemical properties of the SEI play a critical role in determining the overall electrochemical performance of Li metal anodes, X-ray photoelectron spectroscopy (XPS) investigations are conducted to examine the composition of SEI formed with the PP separator and with the as-prepared M-HAP@MXene separator. The above PP cell's SEI shows C 1s peaks of 285.2 and 287.8 eV as well as O 1 s peak around 530.4 eV that are related to the C—O and C=O groups appearing on the surface. The M-HAP@PVHF cell's SEI formed on the Li foil contains a limited concentration of Li—CO$_2^-$ (with peaks at 288.8 eV in the C 1 s spectrum and 54.4 eV in the Li 1 s spectrum), dominated LiF (peaks at 684.1 eV in the F 1 s spectrum and 56.2 eV in the Li 1 s spectrum). In contrast, the PP. cell shows Li—CO$_2$— is the dominant salt.

It is encouragingly-found that the use of the M-HAP@PVHF separator alters the SEI composition, confirming that the bifunctional separator integrates the lithiophilic feature of —F functional groups and fast electrolyte diffusion pathways with the excellent mechanical strength of MXene nanosheets and thus enables molecular-level homogeneous and fast lithium ionic flux on the surfaces of electrodes.

Figure 11A:
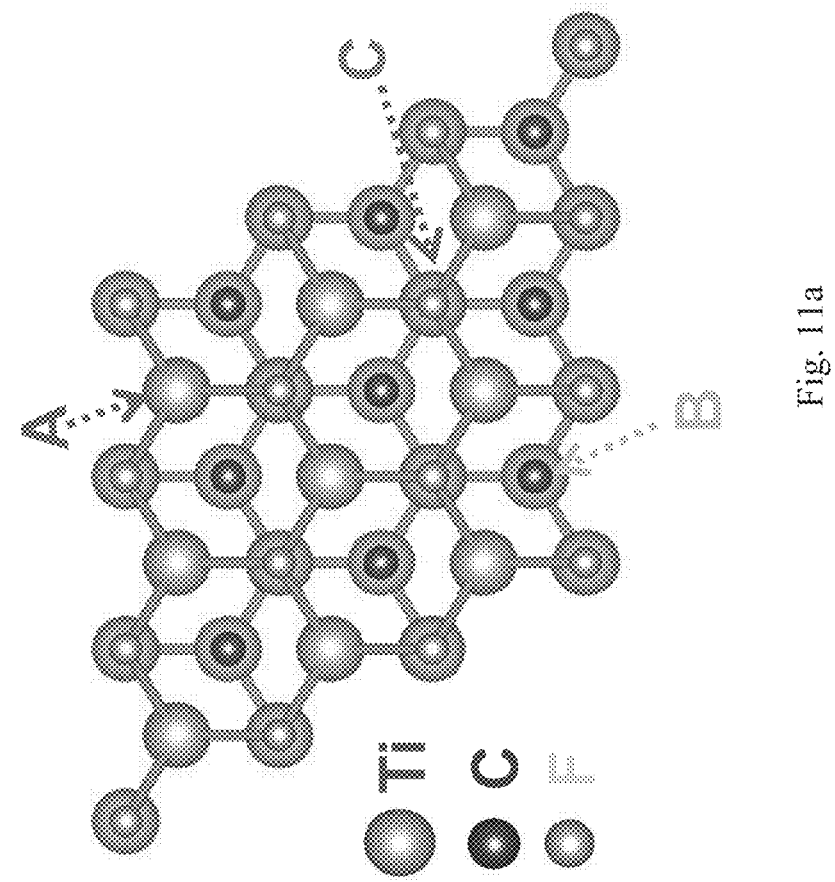
FIG. 11*a* shows an optimized ion map of Li interaction sites in a Ti$_3$C$_2$T$_x$ host.
Figure 11B:
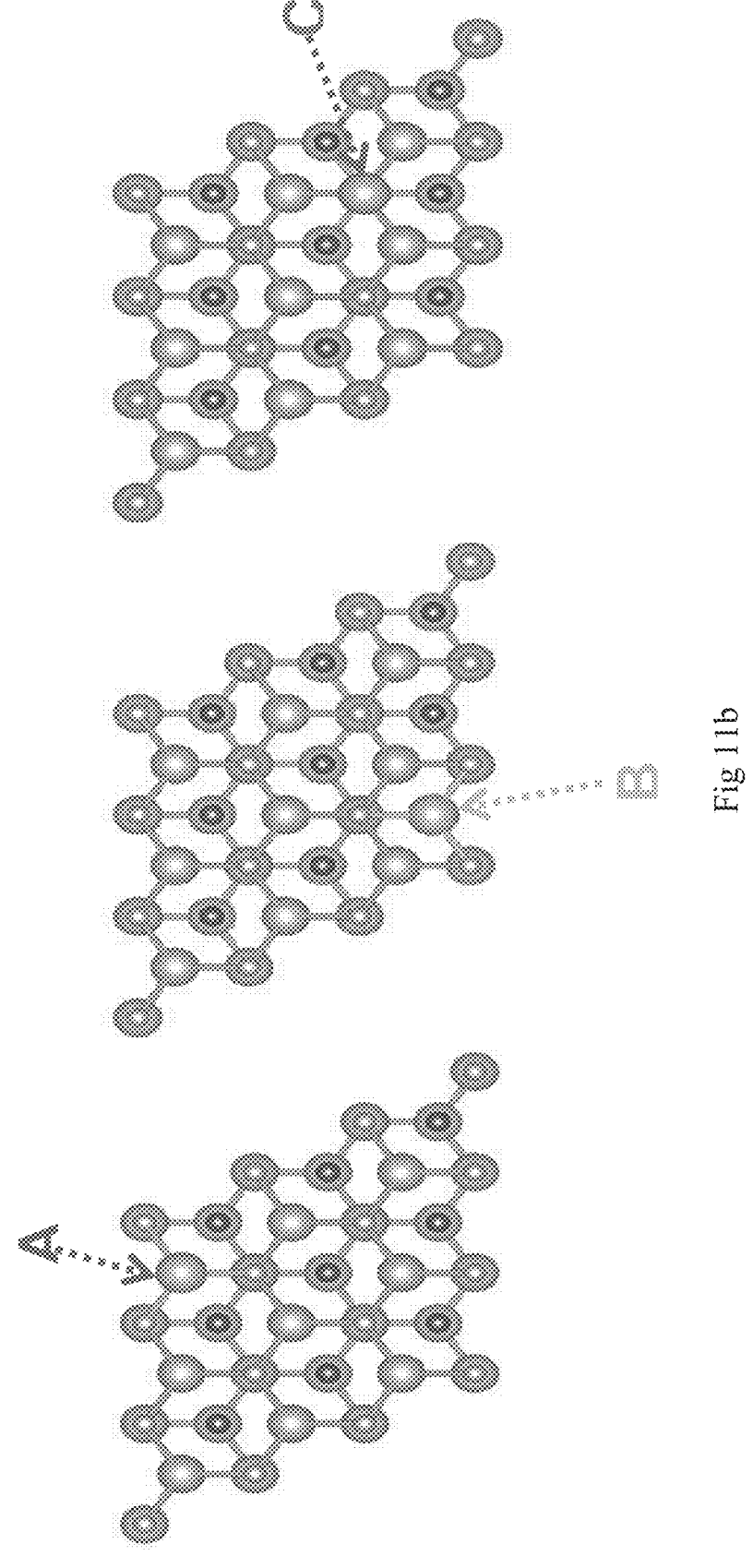
FIG. 11*b* shows the detailed interaction sites between Li ions and Ti$_3$C$_2$T$_x$ host, which are established above Ti, C, and F atoms, respectively.

FIG. 11a shows an optimized ion map of Li interaction sites in a Ti$_3$C$_2$T$_x$ host where the Ti$_3$C$_2$F$_2$ slab is constructed with superficial Ti atoms (e.g., arrow A) with F terminations (e.g., arrow C) due to the dominant F groups on Ti$_3$C$_2$ surface. The adsorption energy between Li and Ti$_3$C$_2$T$_x$ is negative showing that Li affinity is proved and demonstrating that Li-ions spontaneously adsorb onto Ti$_3$C$_2$T$_x$ surfaces. F sites present the lowest adsorption energy when compared with that of Ti and C sites (e.g., arrow B), suggesting the highest lithiophilicity of F terminated groups which may in turn contribute to the uniform growth of SEI layers containing LiF. FIG. 11b shows the detailed interaction sites between Li ions and Ti$_3$C$_2$T$_x$ host, which are established above Ti (arrow A), C (arrow B), and F (arrow C) atoms, respectively. FIGS. 11a and 11b have the same legend and atom representation/codings.

Furthermore, density of states curves show that the MXene layer facing the Li anode inherits the metallic properties of MXene, and its competent electronic conduction reduces interfacial resistance and enhances Li$^+$ transport.

Example 4

Thermal shrinkage values from literature are available as follows:

| Materials | Thermal shrinkage | Ref. |
|---|---|---|
| Al$_2$O$_3$ | 0% at 180° C. | 1 |
| PE | 71.2% at 170° C. | 2 |
| PAN | ~3% at 200° C. for 45 min | 3 |
| PEI | 0% at 150° C. for 1 h | 4 |
| PVDF-HFP | 10.6% at 175° C. | 5 |
| SiO$_2$ | 0% at 175° C. for 1 h | 6 |
| PMMA/PEEK | 13.37% at 240° C. for 12 h | 7 |

1 G. Sharma, Y. Jin and Y. S. Lin, *J. Electrochem. Soc.*, 2017, 164, A1184-A1191
2 L. Peng, X. Kong, H. Li, X. Wang, C. Shi, T. Hu, Y. Liu, P. Zhang, ad J. Zhao, *Adv. Funct. Mater.* 2020, 2008537.
3 N. Sabetzadeh, A. A. Gharehaghaji and M. Javanbakht, *J. Polym. Res.* 2019, 26, 20.
4 L. S. Kong, B. X. Liu, J. L. Ding, X. N. Yan, G. F. Tian, S. L. Qi and D. Z. Wu, *J. Membr. Sci.*, 2018, 549, 244-250.
5 L. H. Ye, X. Y. Shi, Z. X. Zhang, J. N. Liu, X. Jian, M. Waqas and W. D. He, *Adv. Mater. Interfaces*, 2017, 4, 1601236.
6 Q. C. Du, M. T. Yang, J. K. Yang, P. Zhang, J. Q. Qi, L. Bai, Z. Li, J. Y. Chen, R. Q. Liu, X. M. Feng, Z. D. Huang, T. Masese, Y. W. Ma and W. Huang, *ACS Appl. Mater. Interfaces*, 2019, 11, 34895-34903.
7 Z. Li, Y. Xiong, S. P. Sun, L. Zhang, S. S. Li, X. G. Liu, Z. H. Xu and S. M. Xu, *J. Membr. Sci.*, 2018, 565, 50-60.

Example 5

The tensile strength of the SEI is tested by an electronic universal testing machine (HS-3001D) (Shanghai Heson Instrument Technology Co., Ltd.) by the following process:

(a) measure and record the dimensions of the M-HAP@PVHF and PP before each test, including width, thickness and length of the gage section for the specimen;

(b) the specimen is first clamped in the upper chuck, and then the lower chuck to move to the appropriate clamping position, the final clamping the lower end of the specimen;

(c) please instruct the instructor to check the above steps to complete the situation, start the test machine, preload a small amount of load (load corresponding to the stress cannot exceed the proportion of the material limit), and then unloaded to zero to check the work of the test machine is normal;

(d) start the test machine, slowly and evenly load, carefully observe the force pointer rotation and drawing device drawing the situation;

(e) check the test record, test equipment, tools, recovery, clean up the test site, save data and convert the tensile test data into stress/strain data for analysis.

Example 6

Studying the electrochemical performances of different separators for Li/PP/LiCoO$_2$ and Li/M-HAP@PVHF/LiCoO$_2$ cells, respectively shows the CV curve for the Li/PP/LiCoO$_2$ cell exhibits one cathodic peak at 4.02 V and one anodic peat at 3.85 V, and two minor cathodic peaks and anodic peaks at 4.08, 4.18 and 4.06, 4.15 V. In contrast, the Li/M-HAP@PVHF/LiCoO$_2$ cell presents one cathodic peak at 4.09 V and one anodic peat at 3.81 V with an obviously large current, in good agreement with the cycling performance during the charge and discharge process. Using the charge transfer resistance at Li anode and the interfacial resistance between electrode and separator soaking electrolytes, the M-HAP@PVHF separator shows a smaller interfacial resistance than that of the conventional PP separator due to the high lithiophilicity and low ionic transport barrier of MXene. Thus, compared with PP, the M-HAP@PVHF separator in LiPF$_6$ based electrolytes exhibits superior ionic conductivities at different temperatures ranging from 25° C. to 80° C. Without intending to be limited by theory, it is believed that such high ionic conductivity can result from the more suitable pore structures and better wettability to the liquid electrolyte of the M-HAP@PVHF as compared to PP.

Example 7

A LIB containing the SEI herein formed of a MXene nanolayer formed from MXene nanoflakes blade coated on both sides of a PVHF framework containing HAPNs is formed. The LIB contains an electrolyte containing ethylene carbonate, ethyl methyl carbonate, and dimethyl carbonate in about a 1:1:1 vol % ratio, and further contains 1M lithium hexafluorophosphate. Such a LIB further contains lithium foil as the anode and LiCoO$_2$ as the cathode. A symmetric cell (e.g., where both electrodes are made from Li metal) based on the M-HAP@PVHF separator delivers a stable lifespan of 700 h with an ultralow overpotential of 15.8 mV at 2 mA cm$^{-1}$ due to the formation of a stable solid electrolyte interfacial (SEI) layer containing LiF and uniform Li deposition. The full cell maintains a stable 150-cycle lifespan with coulombic efficiency above 95% and delivers a 99% capacity retention (145 mAh g$^{-1}$).

Example 8

Cycle testing curves and corresponding selected GCD curves indicate that the initial specific capacity of the M-HAP@PVHF separator based full cell (80 mAh/g) is slightly lower than that of the PP based cell (103 mAh/g) when the current density is 1 C, related to the slow activation of the LIB cell and the formation of dense SEI, After 150 cycles, the Li/M-HAP@PVHF/LiCoO$_2$ cell maintains a stable coulombic efficiency above 95% without significant fluctuations, and still delivers a 99% capacity retention (145 mAh/g). In contrast, after 150 cycles, the Li/PP/LiCoO$_2$ cell capacity decays from 140 mAh/g to 75 mAh/g with a capacity retention of 53.6%.

Without intending to be limited by theory, it is believed that the effective Li dendrites tunability of the fabricated M-HAP@PVHF provides significant battery life extension. Similar results are also observed in the rate capability tests at different current densities where the M-HAP@PVHF separator exhibits a better rate performance with a LiCO$_2$ working electrode. The discharge capacity for the Li/M-HAP@PVHF/LiCoO$_2$ cell is about 127.5 mAh/g at 5 C, which is much (38%) higher than that for the Li/PP/LiCoO$_2$ cell (92.5 mAh/g). The above long cycle endurance and superior rate capability prove the benefits of introducing a M-HAP@PVHF separator in LIBs, which may enable the generation of stable SEI layers on Li anode via the Ti$_3$C$_2$T$_x$'s aggressive F-terminations.

Example 9

Figure 2:
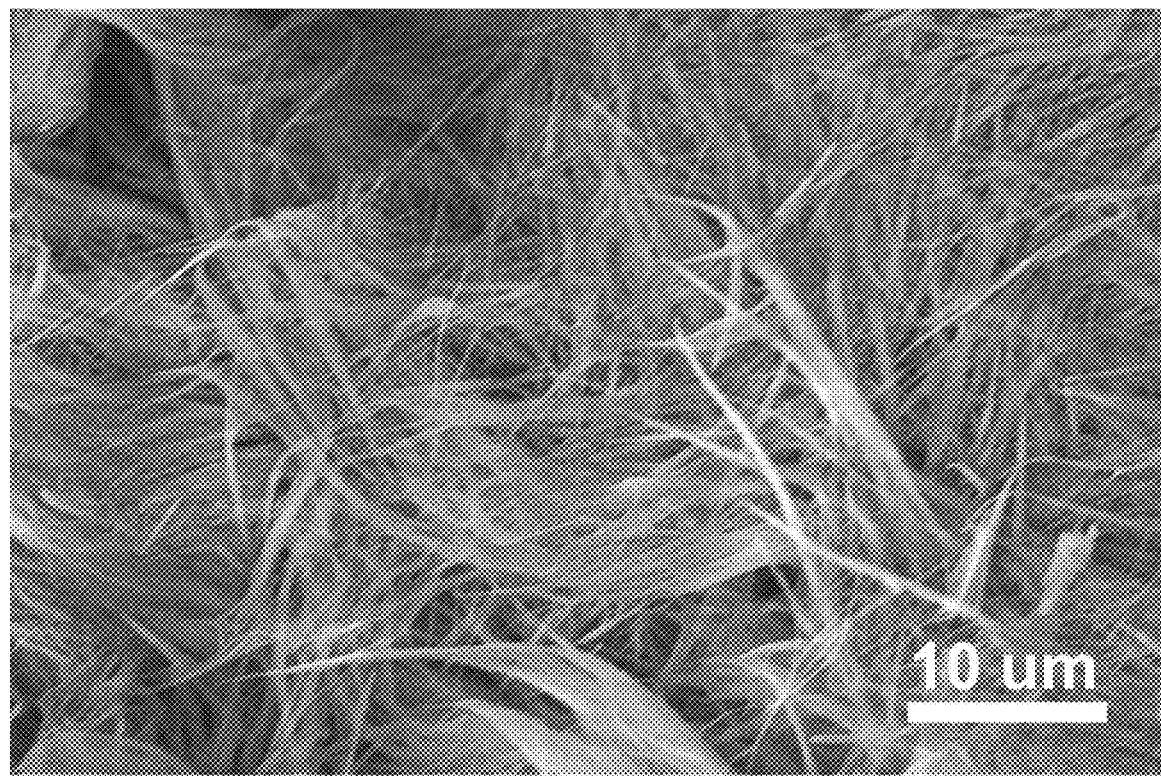
FIG. 2 shows a scanning electron microscope image of an embodiment of the HAP nanowires.
Figure 3:
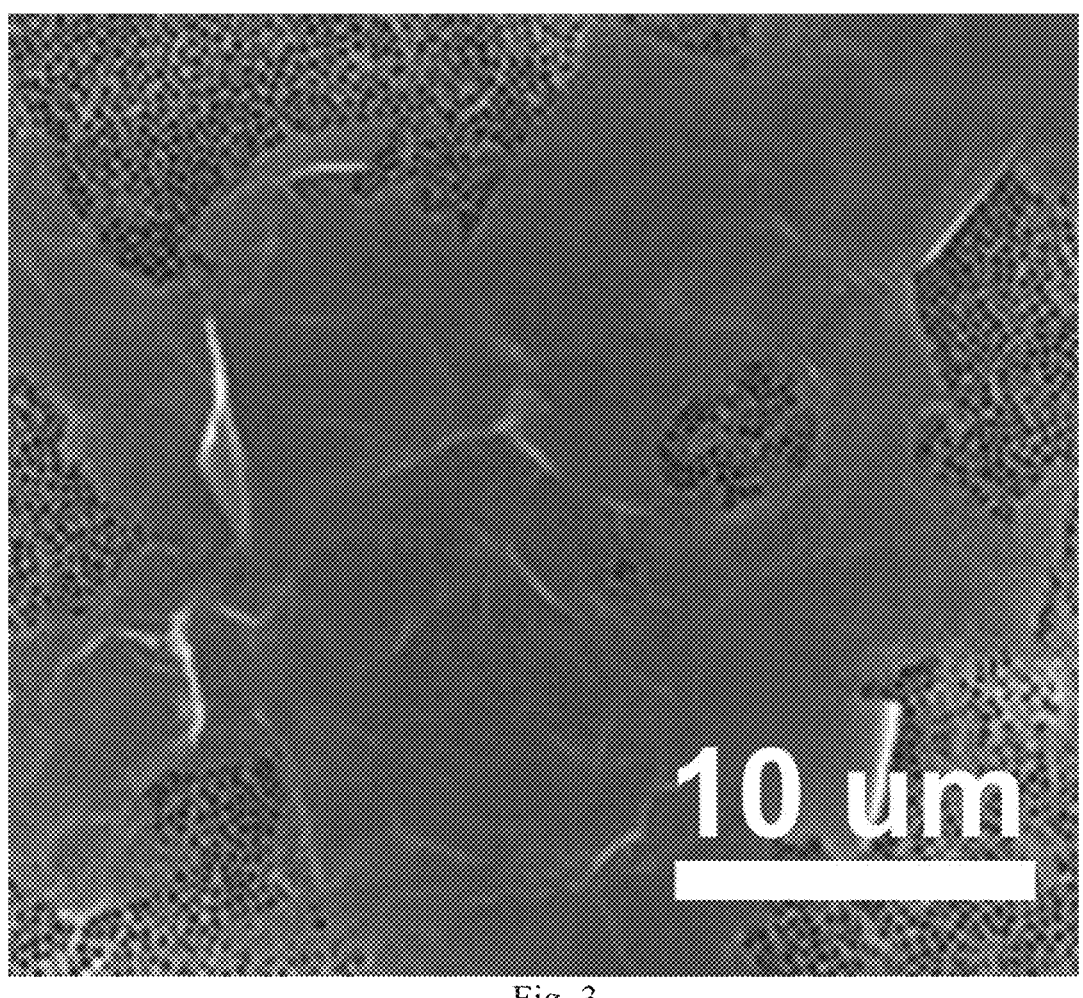
FIG. 3 shows a scanning electron microscope image of an embodiment of a MXene nanosheet.
Figure 4:
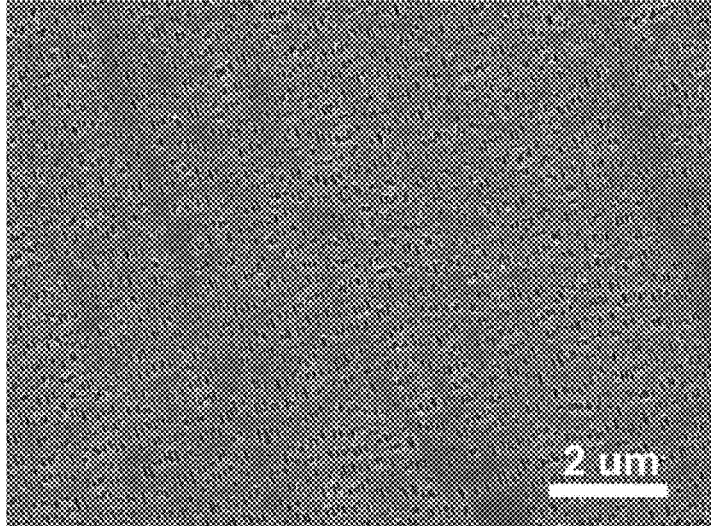
FIG. 4 shows a scanning electron microscope image of a commercially-available polypropylene separator.
Figure 5:
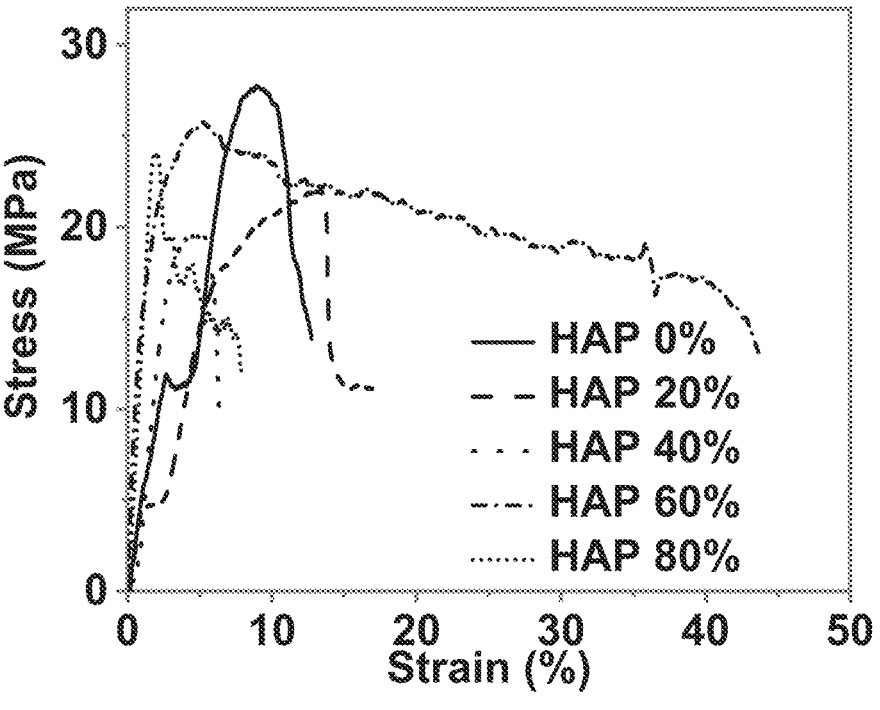
FIG. 5 shows a graph of strain-stress curves of a embodiments of the HAP@PVHF membrane herein.

Separator Characterization
SEM images of the HAP networks in FIG. 2 show an interwoven structure with abundant junction points, the diameter of which wires range from about 20 nm to about 50 nm. The surface of M-HAP@PVHF shows multi-layers of MXene flakes coated on the HAP@PVHF membrane with a bulk PVHF polymer structure interspersed with HAP nanowires. The average MXene flake size of Ti$_3$C$_2$T$_x$ is around 10.2 μm with a ~1.1 nm thickness, which enhances the PVHF polymer chain's ion conductivity. The cross-sectional SEM image and its corresponding energy-dispersive X-ray, spectroscopy (EDS) mapping of the M-HAP@PVHF separator indicate that the network-structured HAP is wrapped with bulk PVHF polymer chains, and the hydrogen bonding and van der Wants force generated from the interactions between —OH of HAP and the exposed —F on the PVHF matrix, form a hierarchical cross-linked structure. It is believed that this further enhance the flame resistance properties of the PVHF matrix. The thickness of the upper MXene layer is calculated to be about 0.23 μm through contrasting the Ti signals in the EDS pattern.

X-ray diffraction (XRD) pattern and Fourier transform infrared (FTIR) spectroscopy confirm the coexistence of the characteristic peaks of HAP, PVHF, and MXene in the fabricated M-HAP@PVHF separator of Example 1.

The fabricated M-HAP@PVHF separator of Example 1 shows a Brunauer-Emmett-Teller (BET) surface area measurement of 15.2 m$^2$ g$^{-1}$, while that of PP separator is reported to be 9.4 m$^2$ g$^{-1}$. Accordingly, the M-HAP@PVHF separator provides significantly greater electrolyte reservoir space thereby facilitating ion transport in the LEE Moreover, the M-HAP@PVHF separator shows a pore size distribution typically skewed to micropore diameters of about 3.8 nm, which fully meets Li ions transport requirements. Meanwhile, the M-HAP@PVHF separator also possesses significantly better tensile performances with an apparent elongation of 45% and a high yield strength of 26 MPa as compared to PP which exhibits a slight elongation of 10% and a low yield strength of 10 MPa.

It should be understood that the above only illustrates and describes examples whereby the present invention may be carried out, and that modifications and/or alterations may be made thereto without departing from the spirit of the invention.

It should also be understood that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable subcombination.

All references specifically cited herein are hereby incorporated by reference in their entireties. However, the citation or incorporation of such a reference is not necessarily an admission as to its appropriateness, citability, and/or availability as prior art to/against the present invention.

What is claimed is:

1. A separator for a battery comprising a porous material including:
   A) Ti$_3$C$_2$T$_x$ MXene nanosheets; and
   B) a single poly (vinylidene fluoride-co-hexafluoropropylene) (PVHF)-hydroxyapatite (HAP) layer having first and second sides, a Ti$_3$C$_2$T$_x$ MXene nanosheet of the Ti$_3$C$_2$T$_x$ MXene nanosheets is directly coated on each of the first and second sides of the single PVHF-HAP layer, wherein the PVHF-HAP layer has a hierarchical cross-linked structure of a network of HAP nanowires wrapped by bulk PVHF polymer chains such that the HAP nanowires are separated by the bulk PVHF polymer chains; wherein the $Ti_3C_2T_x$ MXene nanosheet directly coated on the first side of the single PVHF-HAP layer is adapted to connect directly to a Li anode, and the $Ti_3C_2T_x$ MXene nanosheet directly coated on the second side of the single PVHF-HAP layer is adapted to connect directly to a $LiCoO_2$ cathode; and wherein the $Ti_3C_2T_x$ MXene nanosheet is in the form of a plurality of $Ti_3C_2T_x$ MXene flakes having an average diameter from about 2 μm to about 50 μm.

2. The separator according to claim 1, wherein the plurality of $Ti_3C_2T_x$ MXene flakes have an average thickness of from about 0.01 nm to about 500 nm.

3. The separator according to claim 1, comprising from about 5% to about 20% by weight $Ti_3C_2T_x$ MXene nanosheet.

4. The separator according to claim 1, comprising from about 50% to about 80% by weight poly (vinylidene fluoride-co-hexafluoropropylene) framework.

5. The separator according to claim 1, comprising from about 20% to about 80% by weight HAP nanowires.

6. The separator according to claim 1, wherein the $Ti_3C_2T_x$ MXene nanosheet has an average thickness of from about 1 nm to about 10 μm.

7. The separator according to claim 1, wherein the PVHF-HAP layer is in form of a membrane.

8. A battery comprising the separator of claim 1.

9. The battery according to claim 8, wherein the battery is a lithium ion battery having an anode and a cathode.

10. The battery according to claim 9, further comprising an electrolyte comprising:

A) lithium hexafluorophosphate;
B) ethylene carbonate;
C) ethyl methyl carbonate; and
D) dimethyl carbonate.

11. The separator according to claim 1, the porous material has a pore size from about 0.01 nm to about 10 nm.

12. The separator according to claim 1 consisting of the porous material.

13. The separator according to claim 1, wherein the bulk PVHF polymer chains and the HAP nanowires have a weight ratio of 1:0.6.

* * * * *